United States Patent [19]
Mitchell

[11] 3,834,831
[45] Sept. 10, 1974

[54] BLADE SHANK COOLING ARRANGEMENT
[75] Inventor: Ernest L. Mitchell, Springfield, Pa.
[73] Assignee: Westinghouse Electric Corporation, Pittsburgh, Pa.
[22] Filed: Jan. 23, 1973
[21] Appl. No.: 325,968

[52] U.S. Cl.............. 416/95, 416/96, 416/193, 416/219
[51] Int. Cl............................................. F01d 5/18
[58] Field of Search.......... 416/92, 95, 97, 219–221, 416/193; 415/115–116

[56] References Cited
UNITED STATES PATENTS

| | | | |
|---|---|---|---|
| 2,141,401 | 12/1938 | Martinka | 416/95 UX |
| 3,171,631 | 3/1965 | Aspinwall | 416/97 X |
| 3,266,770 | 8/1966 | Harlow | 416/97 X |
| 3,325,144 | 6/1967 | Wilde et al. | 416/92 |
| 3,610,769 | 10/1971 | Schwedland | 416/97 X |
| 3,700,348 | 10/1972 | Corsmeier et al. | 416/95 X |
| 3,709,631 | 1/1973 | Karstensen et al. | 416/95 |
| 3,715,170 | 2/1973 | Savage et al. | 416/97 |

FOREIGN PATENTS OR APPLICATIONS

| | | | |
|---|---|---|---|
| 590,522 | 1/1960 | Canada | 415/115 |
| 1,043,718 | 11/1958 | Germany | 416/95 |
| 452,412 | 8/1936 | Great Britain | 416/95 |
| 872,705 | 7/1961 | Great Britain | 416/96 |

Primary Examiner—Everette A. Powell, Jr.
Attorney, Agent, or Firm—D. N. Halgren

[57] ABSTRACT

In a gas turbine engine, an arrangement for cooling turbine blade shanks for gas turbines, wherein a perforated chamber is arranged to cause a cooling fluid to impinge with a predetermined pattern upon inner wall surfaces of a cavity in a shank portion of a turbine blade and/or the outer walls of adjacent blade shanks. The cooling fluid may escape through radially directed passageways within the turbine blade or through a space between the adjacent blade platforms.

7 Claims, 9 Drawing Figures

3,834,831

3,834,831

BLADE SHANK COOLING ARRANGEMENT

BACKGROUND OF THE INVENTION

This invention relates generally to turbine rotors, and more particularly to a structure for cooling rotor blade shanks and portions of rotor discs.

Efficiency of gas turbine engines is highly dependent on the turbine inlet temperatures of the working fluid. If the present inlet gas temperature of approximately 2,000°F is doubled, theoretically the turbine can double its power per pound of working fluid, or in the alternative, the size of the turbine could be reduced by one half for an equal power output.

Metallurgical limitations on turbine blades present a barrier to utilizing high inlet temperatures. In order to overcome these limitations, the blades must be effectively cooled. The present common practice in cooling turbine blades, including the root and the shank portion, is to introduce a cooling fluid, usually air, to an area radially inwards of the blade root, then to direct this air to radial passageways which originate in the root and extend through the airfoil portion of the blade. The cooling effectiveness of these arrangements has been inadequate, particularly during the machine startup as the rapid heating of the roots create thermal gradients, which induce early thermal fatigue.

SUMMARY OF THE INVENTION

In accordance with the present invention, the foregoing drawbacks associated with prior art cooling devices are overcome by a turbine rotor construction wherein jets of coolant fluid are impinged with a predetermined pattern upon interior cavity surfaces of hollow blade shanks and/or the exterior surfaces of adjacent hollow or solid blade shanks and rotor disc peripheral surfaces, by a pressurized perforated chamber positioned within the hollow shank cavity and/or between adjacent blade shanks on the disc periphery. The blade shank is thus defined as that portion of the blade between the airfoil section, that part of the blade that cooperatively associates with the elastic rotor fluid, and the root portion, that segment of the blade that provides interlocking engagement with the grooves on the disc.

BRIEF DESCRIPTION OF THE DRAWINGS

For a better understanding of the nature of the invention, reference may be made to the following descriptions, taken in conjunction with the accompanying drawings, in which.

DESCRIPTION OF THE PREFERRED EMBODIMENT

Figure 1:
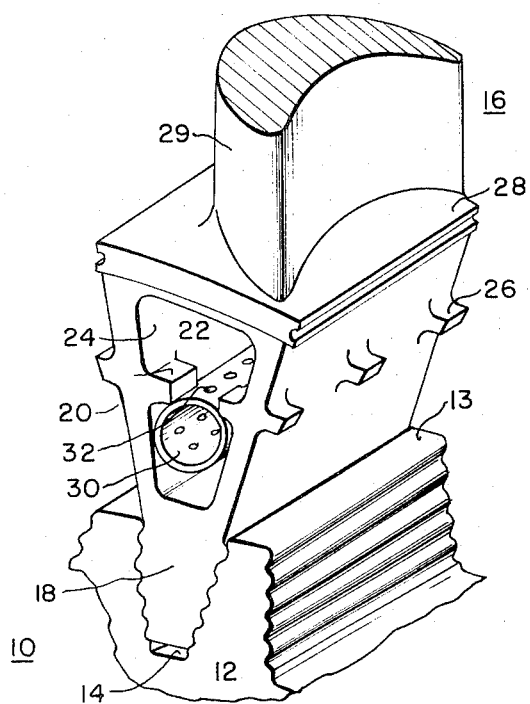
FIG. 1 is a perspective view showing a portion of a rotor disc, a portion of a rotatable blade including a root portion, a hollow shank portion and a segment of an airfoil portion, and a perforated tube disposed within the hollow shank portion.
Figure 2:
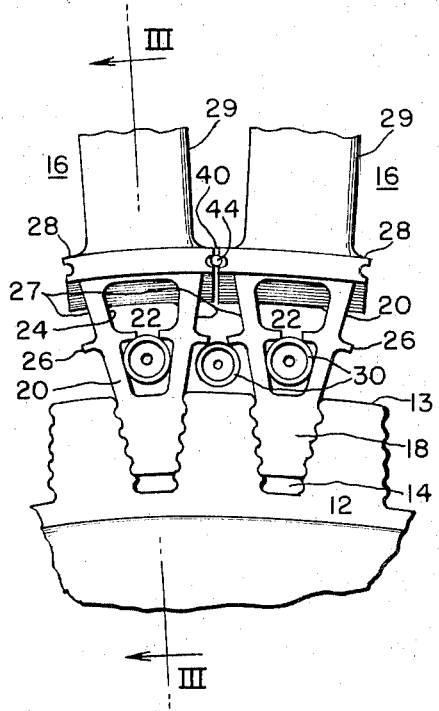
FIG. 2 is an elevational view of a portion of the disc, showing two blades, and several perforated tubes.
Figure 6:
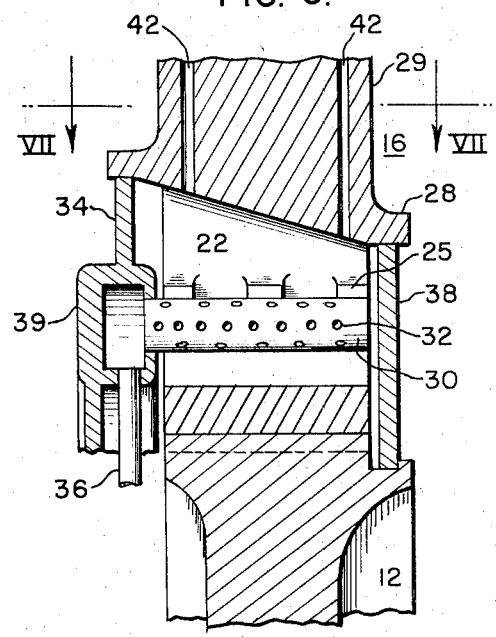
FIG. 6 is a sectional view similar to FIG. 3 showing the cooling tube, and the fluid passageways in the airfoil portion of the blade.

Referring to the drawings in detail, particularly to FIGS. 1 and 2, the structures shown therein comprises a portion of an axial flow gas turbine 10, which includes: a rotor disc 12, having a periphery 13, a plurality of substantially axially disposed grooves 14 spaced on the rotor periphery 13; and an array of radially disposed cooled turbine blades 16 mounted in the grooves 14. Each blade comprises a root portion 18, a shank portion 20, and has a cavity 22 having an inner surface 24 and a plurality of lugs 25 which protrude from the inner surface. The shanks 20 also have external surfaces 27 from which lugs 26 protrude. Disposed radially outwardly of the shank portion is a platform portion 28, and an airfoil portion 29. A tube 30 or tubular shaped chamber is disposed in the cavity 22 and between adjacent shanks 20. The tubes 30 are restrained from radial movement by the lugs 25 and 26. The tube 30 has a plurality of perforations 32. An upstream sealing disc 34 is disposed on the upstream side of the blade root and shank portions. A coolant fluid supply duct 36 is connected to an inlet chamber 39 disposed in the sealing disc 34 and in fluid communication with one end of the tube 30. A downstream sealing disc 38 is disposed on the downstream side of the blade root and shank portion. The coolant fluid is pressurized and introduced into the chamber 30 through the supply tube 36. The perforations 32 are arranged in a predetermined pattern causing jets of the pressurized fluid to impinge in a predetermined manner upon the internal surfaces 24 of the cavity 22. The lugs 26 extending from surfaces 24 are spaced apart to allow jets of the cooling fluid to impinge upon the entire internal surface 24 of shanks 20. This arrangement provides for even cooling throughout the blade root 18 and walls of the shank portion 20. The rear seal 38 is also cooled by jets of cooling fluid flowing from a perforation 32 disposed in the end of chamber 30. This cooling fluid can pass around the upstream and downstream ends of shank 20 and escape through a gap 40 between two adjacent blade platforms 28 or it may escape through a plurality of passageways 42 in the airfoil portion 29, as shown in FIG. 6.

Figure 8:
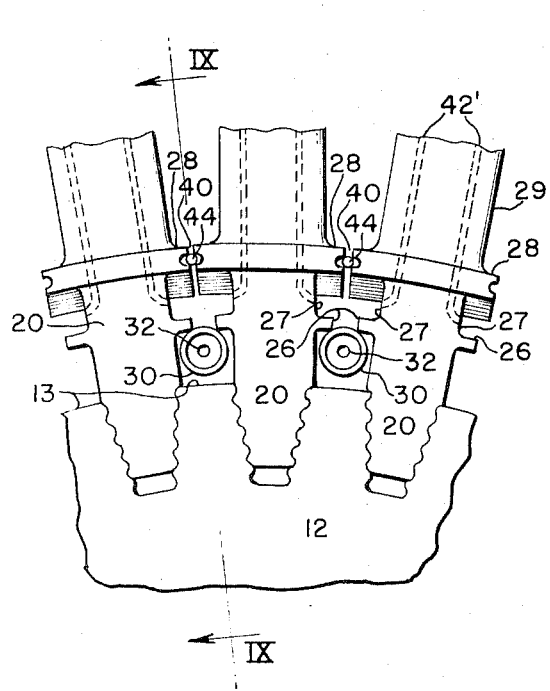
FIG. 8 is a partial elevational view a turbine rotor and several blades.
Figure 9:
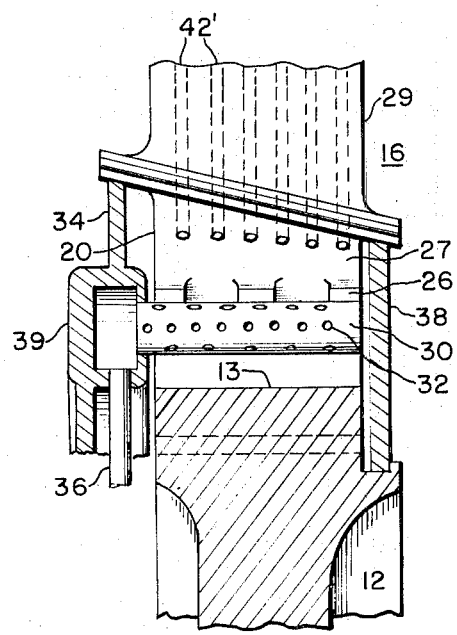
FIG. 9 is a sectional view taken along the line IX—IX of FIG. 8.

The perforated tubes 30 may each have their respective major axis disposed generally parallel to the axis of rotation of the disc 12 both within the cavity 22 of shank 20 and between adjacent shanks 20 as shown in FIG. 2. Lugs 26 and 25 extend, respectively, from the external walls 27 of shank 20 and from the internal walls 24 the shank 20. The perforated tubes 30, when disposed in this manner directs jets of the cooling fluid upon the external walls 27 and upon the rotor disc peripheral surface 13. The cooling fluid escapes through gaps 40 between adjacent platforms 28 and through passageways 42' as shown in FIGS. 8 and 9. The passageways 42' provide a flow path for cooling fluid to flow from the areas between adjacent blade shanks and through the airfoil 29 portion of the blade.

Figure 3:
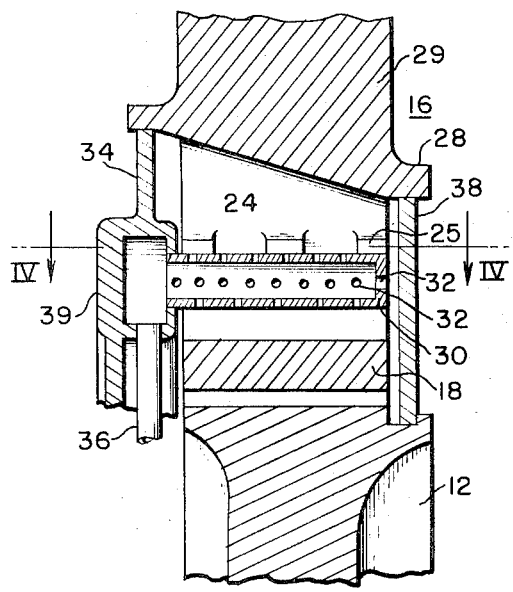
FIG. 3 is a sectional view through the center of the blade taken along the line III—III of FIG. 2.
Figure 4:
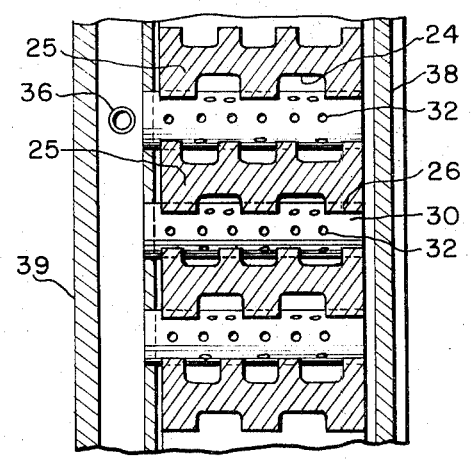
FIG. 4 is a sectional view taken on line IV—IV in FIG. 3.
Figure 5:
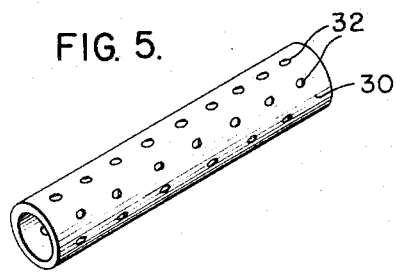
FIG. 5 is a perspective view of tube showing a pattern of the perforations.

The implacement of perforated chambers 30 in cavities 22 in the hollow shanks 20, and between shanks 20 on the disc 12 is also shown in FIG. 4. The gap 40 between the adjacent blade platforms 28 which allows the escape of cooling fluid is clearly shown in FIGS. 2 and 3. A plurality of cylindrical buffer segments 44 may be disposed between the platforms 28 to prevent movement of the blades 16 towards each other, and still permit the escape of cooling fluid therethrough.

Figure 7:
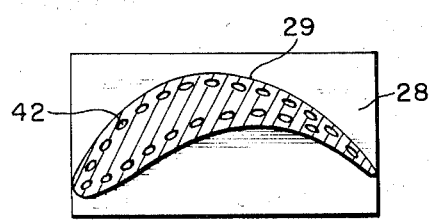
FIG. 7 is a sectional view taken on line VII—VII in FIG. 6.

A perspective view of the perforated tube 30, a portion of the blade 16 and the disc 12 is shown in FIG. 1. The blade root 18 as shown is of the "fir-tree" configuration. The chamber 30 has perforations 32 arranged in a predetermined pattern to cause jets of the cooling fluid to impinge upon predetermined surfaces of the blade. FIG. 6 is similar to FIG. 3, except fluid passageways 42 extend radially from the cavity 22 within the hollow shanks 20 and through the airfoil portion 29 of the blade. The disposition of passageways 42 is shown in FIG. 7. These passageways 42 also provide for cooling of the airfoil 29 as the cooling fluid flows therethrough.

In the embodiment shown in FIG. 8 the perforated cooling tubes 30 are disposed between adjacent solid blade shanks 20 and not within hollow cavities 22. The curvelinear cooling fluid exit passageways 42' originate adjacent the external walls 27 and extend radially outward through the airfoil portion 29.

FIG. 9 shows the perforated tube 30 arranged so that the perforations cause cooling fluid to impinge upon the external shank surfaces 27, the rear seal 38, and the dis's peripheral surface 13. The fluids escape through passageway 42' orifices in the external walls 27 or through the gap 40 between adjacent blade platforms 28.

The arrangement hereinbefore described provides maximum utilization of cooling fluid to reduce the range of thermal gradients and to allow the use of less expensive materials in the construction of rotor discs and blades and still maintain close clearance and provide the necessary strength within the turbine compartments.

What we claim is:

1. An elastic motive fluid turbomachine rotor structure comprising;
   a rotor disc
   a plurality of blades attached to said disc, said blades having a root portion, an intermediate shank portion, and an air foil portion,
   at least one perforated generally tubular chamber having its major axis disposed generally parallel to the axis of rotation of said rotor disc and in a spaced relation to said blade shank,
   means for supplying a coolant fluid under pressure to each of said perforated generally tubular chambers whereby jets of coolant fluid impinge upon predetermined surface portions of said turbomachine rotor structure,
   means for sealing portions of said rotor disc, and
   means for discharging said coolant fluid into said turbomachine.

2. An elastic motive fluid turbomachine rotor structure as recited in claim 1, wherein said blade shanks are hollow and said perforated generally tubular chambers are disposed within said hollow portions of said shanks.

3. An elastic motive fluid turbomachine rotor structure as recited in claim 1, wherein said sealing means comprises an upstream sealing disk disposed on said rotor, a downstream sealing disk disposed on said rotor, said supply means being disposed through said one of said sealing disks to provide a pressurized coolant fluid to said perforated tubular chambers, said coolant fluid impinging with a predetermined pattern upon said surface portions to be cooled which include said blade shank surfaces comprising said hollow shank surfaces.

4. An elastic fluid turbomachine rotor structure as recited in claim 3, wherein said coolant fluid discharge means comprises at least one passageway extending from said hollow portion of said shank through said air foil portion for the flow of coolant fluid therethrough, after impingement of said coolant fluid upon said hollow blade shank surfaces.

5. An elastic motor fluid turbomachine rotor structure as recited in claim 3, wherein said shank portion surfaces to be cooled have lugs disposed thereon to restrain radial movement of said perforated generally tubular chambers.

6. An elastic motor fluid turbomachine rotor structure as recited in claim 5, wherein each of said perforated generally tubular chambers is disposed beyond the periphery of said disk, between two adjacent shank portions of said blades.

7. An elastic motor fluid turbomachine rotor structure as recited in claim 6, wherein said perforated generally tubular chambers are disposed within said hollow portions of said shanks and also between at least two of said blades shanks of two adjacent blades, to permit the jetting of cooling fluid upon external and internal blade shank surfaces.

* * * * *